United States Patent
Misu et al.

(10) Patent No.: US 10,069,390 B2
(45) Date of Patent: Sep. 4, 2018

(54) SYNCHRONOUS RELUCTANCE ROTATING ELECTRIC MACHINE

(71) Applicant: KABUSHIKI KAISHA TOSHIBA, Minato-ku, Tokyo (JP)

(72) Inventors: Daisuke Misu, Tama Tokyo (JP); Katsutoku Takeuchi, Kawasaki Kanagawa (JP); Makoto Matsushita, Fuchu Tokyo (JP); Yutaka Hashiba, Yokosuka Kanagawa (JP); Norio Takahashi, Yokohama Kanagawa (JP); Kazuaki Yuuki, Tokorozawa Saitama (JP); Toshio Hasebe, Hachioji Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 15/283,213

(22) Filed: Sep. 30, 2016

(65) Prior Publication Data

US 2017/0019006 A1    Jan. 19, 2017

Related U.S. Application Data

(63) Continuation of application No. PCT/JP2015/061098, filed on Apr. 9, 2015.

(30) Foreign Application Priority Data

Apr. 11, 2014   (JP) .................................. 2014-081944

(51) Int. Cl.
*H02K 19/02*    (2006.01)
*H02K 1/02*    (2006.01)
(Continued)

(52) U.S. Cl.
CPC ................ *H02K 19/02* (2013.01); *H02K 1/02* (2013.01); *H02K 1/22* (2013.01); *H02K 1/246* (2013.01); *H02K 2213/03* (2013.01)

(58) Field of Classification Search
CPC .......... H02K 1/246; H02K 19/02; H02K 1/02; H02K 1/22; H02K 2213/03
(Continued)

(56) References Cited

U.S. PATENT DOCUMENTS 3,652,885 A     3/1972  Honsinger
5,818,140 A *  10/1998  Vagati .................... H02K 1/246
                                                            310/152

(Continued)

FOREIGN PATENT DOCUMENTS

CN       103081299 A     5/2013
JP       2001211618 A    8/2001
(Continued)

OTHER PUBLICATIONS

International Search Report (ISR) and Written Opinion dated Jun. 16, 2015 issued in International Application No. PCT/JP2015/061098.

(Continued)

*Primary Examiner* — Alex W Mok
(74) *Attorney, Agent, or Firm* — Holtz, Holtz & Volek PC

(57) ABSTRACT

A synchronous reluctance rotating electric machine of an embodiment has a rotor iron core provided with a plurality of air gap layers, and a stator. The rotor iron core has a plurality of band-shaped magnetic path layers, and at least one or more bridges that bridge across each of the air gaps adjacent to each other among the plurality of air gap layers. The bridges of the air gaps adjacent to each other are disposed on different straight lines.

5 Claims, 6 Drawing Sheets

(51) Int. Cl.
*H02K 1/22* (2006.01)
*H02K 1/24* (2006.01)

(58) Field of Classification Search
USPC .......................................................... 310/162
See application file for complete search history.

(56) References Cited

U.S. PATENT DOCUMENTS

| | | | |
|---|---|---|---|
| 6,239,526 | B1 | 5/2001 | Oh et al. |
| 6,259,181 | B1* | 7/2001 | Kawano ................. H02K 1/246 310/162 |
| 6,630,762 | B2 | 10/2003 | Naito et al. |
| 2002/0041127 | A1* | 4/2002 | Naito ................... H02K 1/2766 310/156.07 |
| 2005/0140238 | A1 | 6/2005 | Yokochi et al. |
| 2006/0043812 | A1 | 3/2006 | Cheong et al. |
| 2012/0062053 | A1* | 3/2012 | Moghaddam .......... H02K 1/246 310/46 |
| 2013/0147303 | A1 | 6/2013 | Kaiser et al. |
| 2015/0229170 | A1 | 8/2015 | Koechlin |
| 2016/0049835 | A1 | 2/2016 | Fukumoto et al. |

FOREIGN PATENT DOCUMENTS

| | | |
|---|---|---|
| JP | 2001258222 A | 9/2001 |
| JP | 2002010547 A | 1/2002 |
| JP | 2004096909 A | 3/2004 |
| JP | 2005245052 A | 9/2005 |
| JP | 4027591 B2 | 12/2007 |
| JP | 4391955 B2 | 12/2009 |
| JP | 2014193076 A | 10/2014 |
| KR | 20040032646 A | 4/2004 |
| TW | 20040032646 A | 4/2004 |
| WO | 2012004761 A2 | 1/2012 |
| WO | 2014041507 A1 | 3/2014 |

OTHER PUBLICATIONS

T. Matsuo et al., "Rotor Design Optimization of Synchronous Reluctance Machine", IEEE Transactions on Energy Conversion, vol. 9, No. 2, Jun. 1994, pp. 359-365.
Extended European Search Report (EESR) dated Feb. 13, 2018 issued in counterpart European Application No. 15776335.0.

* cited by examiner

SYNCHRONOUS RELUCTANCE ROTATING ELECTRIC MACHINE

CROSS-REFERENCE TO RELATED APPLICATIONS

This application is a continuation of International Application No. PCT/JP2015/061098, filed Apr. 9, 2015, which is based upon and claims the benefit of priority from Japanese Patent Application No. 2014-081944, filed on Apr. 11, 2014; the entire contents of which are incorporated herein by reference.

FIELD

Embodiments described herein relate generally to a synchronous reluctance rotating electric machine.

BACKGROUND

Conventionally, synchronous reluctance rotating electric motors including a rotor iron core provided with a plurality of circular-arc air gap layers, and a stator are known. In such synchronous reluctance rotating electric motors, there is a rotor iron core including bridges that bridge over air gaps in order to guarantee mechanical strength during rotation. However, by including the bridges that bridge over the air gaps, there are possibilities that leakage flux may be increased between magnetic paths adjacent to each other via air gaps and torque and power factor may decline.

DETAILED DESCRIPTION

A synchronous reluctance rotating electric machine of an embodiment includes a rotor iron core provided with a plurality of air gap layers, and a stator. The rotor iron core includes a plurality of band-shaped magnetic path layers, and at least one or more bridges that bridge across each of air gaps adjacent to each other among the plurality of air gap layers. The bridges of the air gaps adjacent to each other are disposed on different straight lines.

Hereinafter, a synchronous reluctance rotating electric machine of an embodiment will be described with reference to the drawings.

Figure 1:
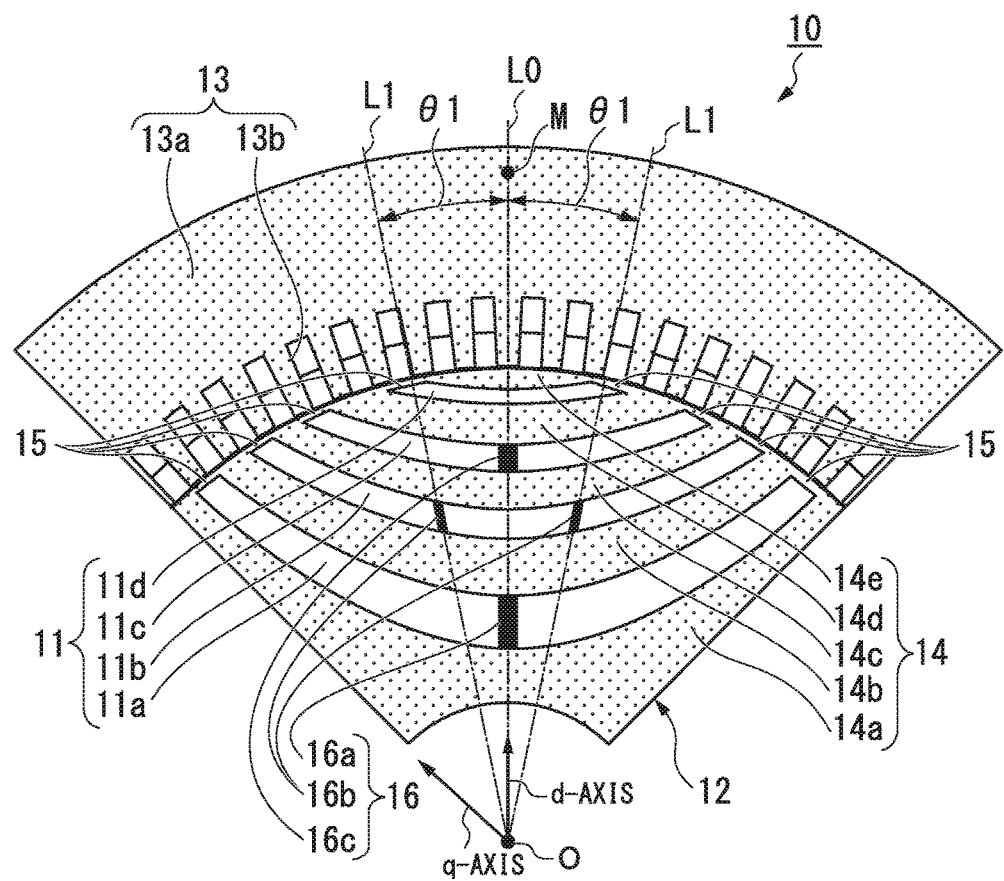
FIG. 1 is a cross-sectional view orthogonal to a rotating shaft showing a partial configuration of a synchronous reluctance rotating electric machine of an embodiment.

The synchronous reluctance rotating electric machine 10 of the embodiment is, for example, a tetrapolar synchronous reluctance rotating electric machine. The synchronous reluctance rotating electric machine 10, as shown in FIG. 1, includes a rotor iron core 12 in which a plurality of air gap layers 11 are provided, and a stator 13.

The rotor iron core 12 has a cylindrical outer shape, and is formed, for example, by stacking a plurality of annular magnetic steel plates. The stator 13 includes a stator iron core 13a that has a greater cylindrical outer shape than the rotor iron core 12, and stator coils (not shown) that are mounted on slots 13b of the stator iron core 13a. The stator iron core 13a is formed, for example, by stacking a plurality of annular magnetic steel plates, and is arranged on an outer peripheral side of the rotor iron core 12.

The rotor iron core 12 in which the plurality of circular-arc air gap layers 11 are provided includes a plurality of band-shaped magnetic path layers 14. In the rotor iron core 12, the plurality of air gap layers 11 and the plurality of band-shaped magnetic path layers 14 are alternately arranged in the direction of a magnetic pole centerline. Each of the plurality of air gap layers 11 and the plurality of band-shaped magnetic path layers 14 has a shape that is convexly curved to an inner peripheral side in the direction of a magnetic pole centerline. In addition, the direction of the magnetic pole centerline is a direction in which a straight line including a rotor center O and a magnetic pole central part M extends, and is the direction of a d-axis. Additionally, the direction of a centerline between poles is the direction of a q-axis.

The rotor iron core 12 of the embodiment includes, for example, four air gaps that are stacked and arranged sequentially from the inner peripheral side toward the outer peripheral side in the direction of the magnetic pole centerline, and five band-shaped magnetic paths. Here, the four air gaps are a first air gap 11a, a second air gap 11b, a third air gap 11c, and a fourth air gap 11d. The five band-shaped magnetic paths are a first band-shaped magnetic path 14a, a second band-shaped magnetic path 14b, a third band-shaped magnetic path 14c, a fourth band-shaped magnetic path 14d, and a fifth band-shaped magnetic path 14e.

The rotor iron core 12 includes an outer-peripheral-side bridge 15 that couple the band-shaped magnetic paths 14 adjacent to each other together via each air gap 11 in an outer peripheral part thereof.

The rotor iron core 12 includes at least one or more bridges 16 that connect the band-shaped magnetic paths 14 adjacent to each other via each air gap 11 together while bridging across each air gap 11, in at least two or more of the plurality of air gap layers 11. The rotor iron core 12 includes, for example, at least one or more bridges 16, in each air gap 11 other than an air gap 11 (an air gap provided at a position near an outermost periphery, that is, the fourth air gap 11d) on an outermost peripheral side in the direction of the magnetic pole centerline, among the plurality of air gap layers 11.

Each bridge 16 is formed of the same material as the rotor iron core 12, and has, for example, a shape disposed on a predetermined straight line that extends in a radial direction from the rotor center O. Each bridge 16 has a width equal to or greater than a lower limit width that is required to guarantee a desired mechanical strength that can withstand the stress that acts during the rotation of the rotor iron core 12. The bridges 16 of the air gaps 11 adjacent to each other among the plurality of air gap layers 11 are disposed on mutually different straight lines so as not to be disposed on the same straight line as each other.

The rotor iron core 12 of the embodiment includes a one first bridge 16a disposed on a magnetic pole centerline L0, in the first air gap 11a (an air gap provided at a position near an innermost periphery) on an innermost peripheral side in the direction of the magnetic pole centerline, among the plurality of air gap layers 11.

Moreover, the rotor iron core 12 includes two second bridges 16b disposed on two first straight lines L1 that are inclined at a first angle θ1 with respect to the magnetic pole centerline L0, in the second air gap 11b (an air gap provided at a position near an outer periphery of the first air gap 11a) on an outer peripheral side of the first air gap 11a in the direction of the magnetic pole centerline. Moreover, the rotor iron core 12 includes a one third bridge 16c disposed on the magnetic pole centerline L0, in a third air gap 11c (an air gap provided at a position near an outer periphery of the second air gap 11b) on an outer peripheral side of the second air gap 11b in the direction of the magnetic pole centerline. Each of the two second bridges 16b has a shape thinner than the one first bridge 16a and the one third bridge 16c.

According to the embodiment described above, by having the bridges 16 disposed on mutually different straight lines in the air gaps 11 adjacent to each other via the band-shaped magnetic paths 14, the bridges 16 can be prevented from being continuously disposed on the same straight line. Accordingly, while guaranteeing mechanical strength, the magnetic resistance can be prevented from becoming small on the same straight line, the leakage flux can be reduced, and a decline in torque and power factor can be limited.

Moreover, by having the bridges 16 disposed on the different straight lines in the air gaps 11 adjacent to each other among the plurality of air gap layers 11 so as not to be disposed on the magnetic pole centerline L0 as each other, the magnetic resistance in the direction of the d-axis can be prevented from becoming small. Accordingly, the leakage flux in the direction of the d-axis can be reduced, and a decline in torque and power factor can be limited.

Moreover, by having the bridges 16 having a shape disposed on a predetermined straight line that extends in the radial direction from the rotor center O, a desired mechanical strength can be efficiently guaranteed with respect to the direction of the stress that acts during the rotation of the rotor iron core 12. Accordingly, the width of the bridges 16 required to guarantee a desired mechanical strength can be appropriately made small, the magnetic resistance can be increased, the leakage flux can be reduced, and torque and power factor can be increased.

Moreover, by having the bridges 16 disposed on the straight lines (that is, the first straight lines L1) that are inclined with respect to the magnetic pole centerline L0, the bridges 16 can be lengthened and the magnetic resistance can be increased, compared with the bridges 16 disposed on the magnetic pole centerline L0. Accordingly, the leakage flux can be reduced and torque and power factor can be increased.

Moreover, by having a bridge 16, which is disposed on the magnetic pole centerline L0, in an air gap 11 of which the width is the largest among the plurality of air gap layers 11, the stress that acts on the outer-peripheral-side bridge 15 during the rotation of the rotor iron core 12 can be relaxed exactly, and a desired mechanical strength can be guaranteed easily.

Hereinafter, the first modified example will be described.

In the above-described embodiment, two air gaps 11 in which the bridges 16 disposed on the same straight line as each other are disposed with another air gap 11 therebetween. However, the invention is not limited to this. The two air gaps 11 in which the bridges 16 are disposed on the same straight line as each other may be disposed with a plurality of the other air gaps 11 therebetween. Accordingly, the bridges 16 may be disposed on mutually different straight lines in all of the plurality of air gap layers 11.

Figure 2:
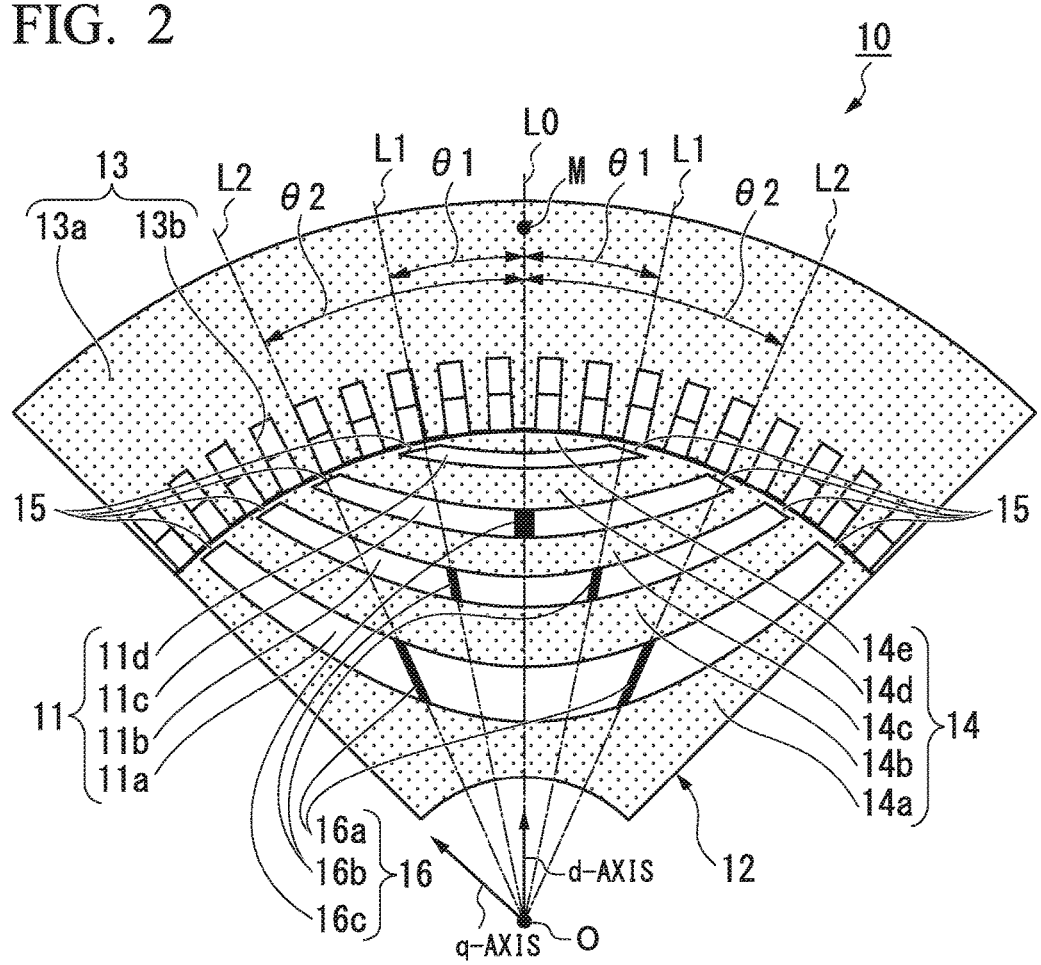
FIG. 2 is a cross-sectional view orthogonal to the rotating shaft showing a partial configuration of the synchronous reluctance rotating electric machine of a first modified example of the embodiment.

The rotor iron core 12 of the synchronous reluctance rotating electric machine 10 of the first modified example of the above-described embodiment, as shown in FIG. 2, includes two first bridges 16a disposed on two second straight lines L2 instead of the above-described one first bridge 16a on the magnetic pole centerline L0. The rotor iron core 12 of the first modified example includes, in the first air gap 11a, the two first bridges 16a that are disposed on the two second straight lines L2 that are inclined with respect to the magnetic pole centerline L0 at a second angle θ2 greater than the first angle θ1. Each of the two first bridges 16a of this first modified example has a shape thinner than the one first bridge 16a of the above-described embodiment.

According to the first modified example, by having the bridges 16 disposed on the mutually different straight lines, a plurality of bridges can be prevented from being disposed on all of the straight lines on which all of the bridges 16 are disposed, while guaranteeing mechanical strength. Accordingly, the magnetic resistance can be prevented from becoming small on all of the straight lines on which the bridges 16 are disposed, the leakage flux can be reduced, and a decline in torque and power factor can be limited. Moreover, by having the plurality of bridges 16 disposed on both sides of the magnetic pole centerline L0 instead of one bridge 16 disposed on the magnetic pole centerline L0, the magnetic paths formed by the bridges 16 can be made thin. As a result, the magnetic resistance can be increased, the leakage flux can be reduced, and torque and power factor can be increased.

Hereinafter, a second modified example will be described.

In the above-described embodiment, the numbers of bridges 16 to be included in the plurality of air gaps 11 are same. That is, as shown in FIG. 1, the number of bridges 16a of the air gap 11a and the number of bridges 16c of the air gap 11c are 1. Additionally, as shown in FIG. 2, the number of bridges 16a of the air gap 11a and the number of the bridges 16b of the air gap 11b are 2. The embodiment is not limited to this. The number of bridges may be different from each other in all of the plurality of air gap layers 11.

Figure 3:
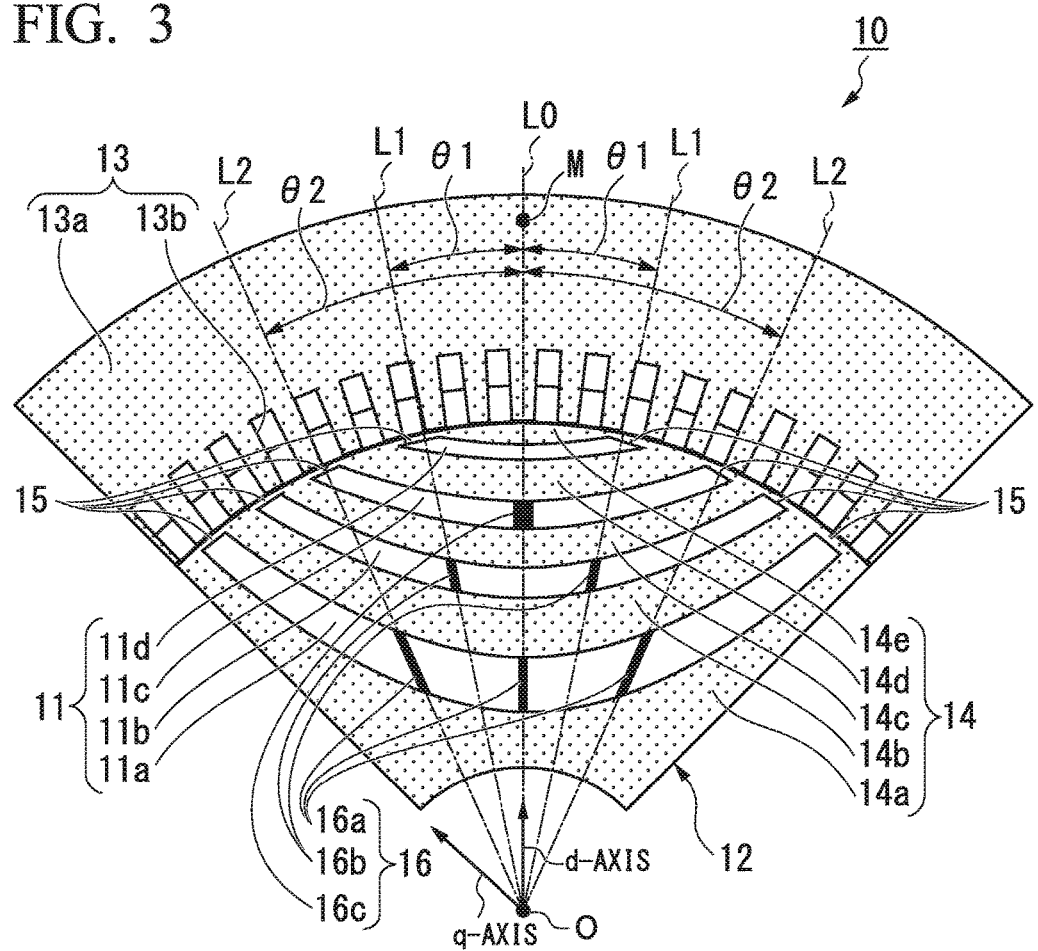
FIG. 3 is a cross-sectional view orthogonal to the rotating shaft showing a partial configuration of the synchronous reluctance rotating electric machine of a second modified example of the embodiment.

The rotor iron core 12 of the synchronous reluctance rotating electric machine 10 of the second modified example of the above-described embodiment, as shown in FIG. 3, includes three first bridges 16a disposed on the magnetic pole centerline L0 and the two second straight lines L2 instead of the above-described one first bridge 16a. The rotor iron core 12 of the second modified example includes, in the first air gap 11a, one first bridge 16a disposed on the magnetic pole centerline L0 and two first bridges 16a disposed on the two second straight lines L2 that are inclined with respect to the magnetic pole centerline L0 at the second angle θ2 greater than the first angle θ1. Each of the three first bridges 16a of this second modified example has a shape thinner than the two first bridges 16a of the above-described first modified example.

According to the second modified example, by having mutually different numbers of bridges 16 in all of the plurality of air gap layers 11 (since the numbers of bridges 16 are made different from each other), magnetic paths formed by the bridges 16 can be made intricate and thin, and the magnetic resistance can be increased. Accordingly, the leakage flux can be reduced and torque and power factor can be increased.

Hereinafter, the third to fifth modified examples will be described.

In the above-described embodiment, each bridge 16 has a shape disposed on a predetermined straight line that extends in the radial direction from the rotor center O. However, the invention is not limited to this. The respective bridges 16 may have shapes disposed on other straight lines.

Figure 4:
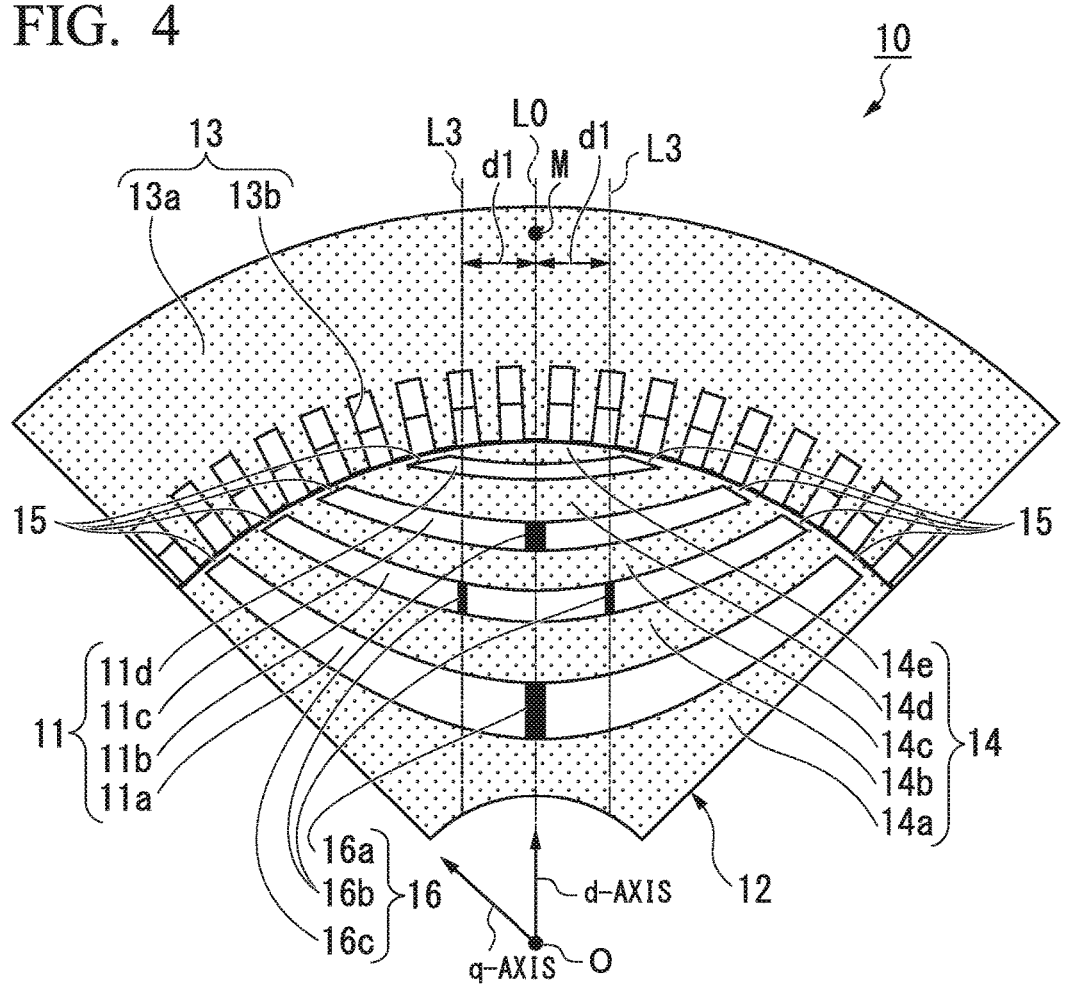
FIG. 4 is a cross-sectional view orthogonal to the rotating shaft showing a partial configuration of the synchronous reluctance rotating electric machine of a third modified example of the embodiment.

In the rotor iron core 12 of the synchronous reluctance rotating electric machine 10 of a third modified example of the above-described embodiment, as shown in FIG. 4, two third straight lines L3 are used instead of the two first straight lines L1 of the above-described embodiment. The rotor iron core 12 of the third modified example includes, in the second air gap 11b, two second bridges 16b disposed on the two third straight lines L3 that are separated by a first distance d1 from the magnetic pole centerline L0 and are parallel to the magnetic pole centerline L0.

Figure 5:
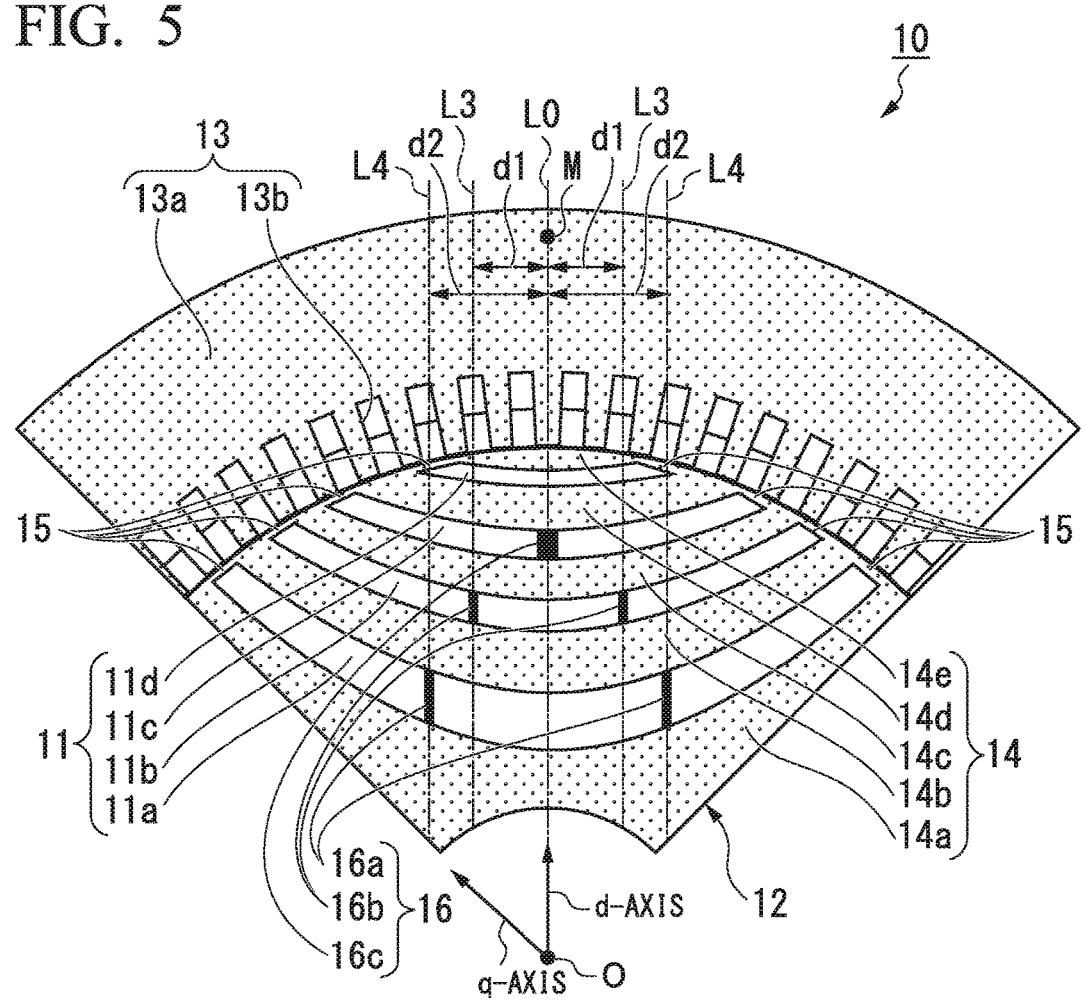
FIG. 5 is a cross-sectional view orthogonal to the rotating shaft showing a partial configuration of the synchronous reluctance rotating electric machine of a fourth modified example of the embodiment.

In the rotor iron core 12 of the synchronous reluctance rotating electric machine 10 of the fourth modified example of the above-described embodiment, as shown in FIG. 5, two third straight lines L3 and two fourth straight lines L4 are used instead of the two first straight lines L1 and the two second straight lines L2 of the above-described first modified example. The rotor iron core 12 of the fourth modified example includes, in the second air gap 11b, two second bridges 16b disposed on the two third straight lines L3 that are separated by a first distance d1 from the magnetic pole centerline L0 and are parallel to the magnetic pole centerline L0. Moreover, the rotor iron core 12 of the fourth modified example includes, in the first air gap 11a, two first bridges 16a disposed on the two fourth straight lines LA that are separated by a second distance d2 greater than the first distance d1 from the magnetic pole centerline L0 and are parallel to the magnetic pole centerline L0.

Figure 6:
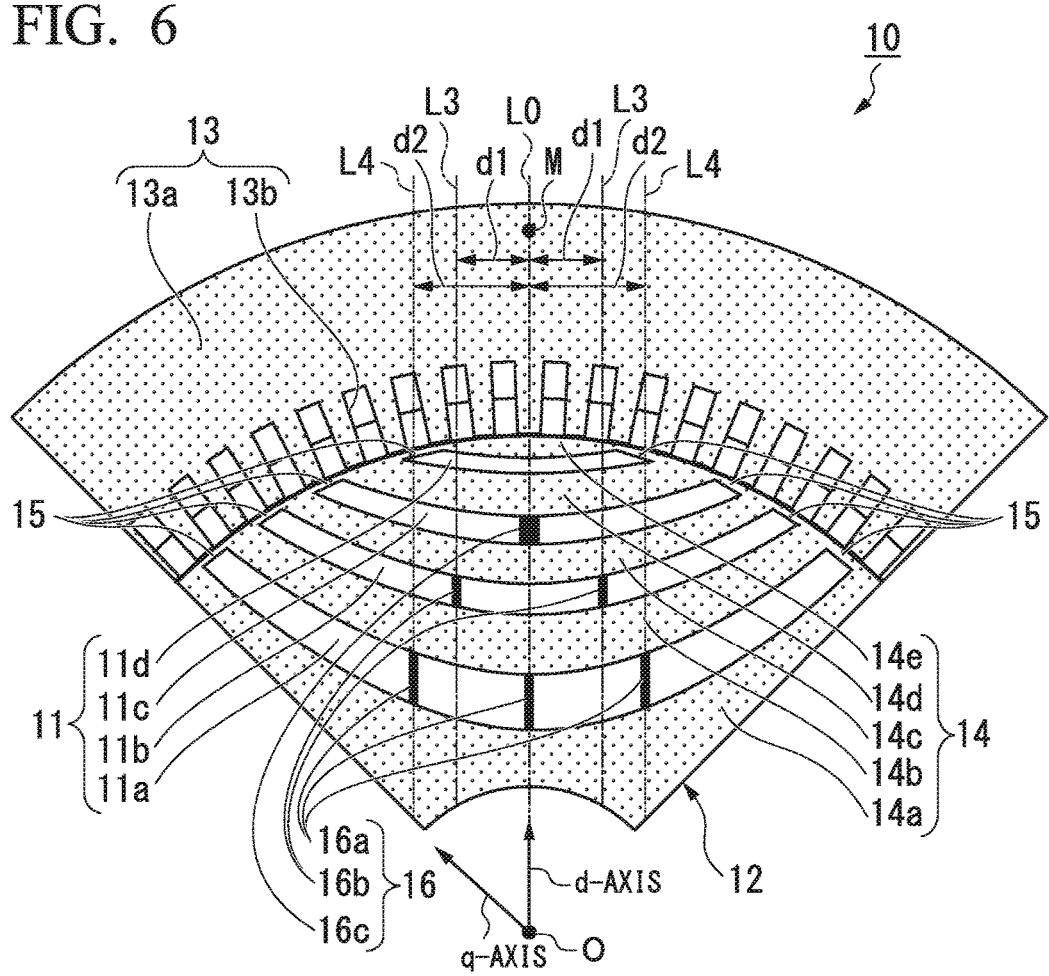
FIG. 6 is a cross-sectional view orthogonal to the rotating shaft showing a partial configuration of the synchronous reluctance rotating electric machine of a fifth modified example of the embodiment.

In the rotor iron core 12 of the synchronous reluctance rotating electric machine 10 of the fifth modified example of the above-described embodiment, as shown in FIG. 6, two third straight lines L3 and two fourth straight lines IA are used instead of the two first straight lines L1 and the two second straight lines L2 of the above-described second modified example. The rotor iron core 12 of the fifth modified example includes, in the second air gap 11b, two second bridges 16b disposed on the two third straight lines L3 that are separated by a first distance d1 from the magnetic pole centerline L0 and are parallel to the magnetic pole centerline L0. Moreover, the rotor iron core 12 of the fifth modified example includes, in the first air gap 11a, one first bridge 16a disposed on the magnetic pole centerline L0, and two first bridges 16a disposed on the two fourth straight lines IA that are separated by the second distance d2 greater than the first distance d1 from the magnetic pole centerline L0 and are parallel to the magnetic pole centerline L0.

According to the third to fifth modified examples, by having the bridges 16 disposed on straight lines other than the straight line that extends in the radial direction from the rotor center O, the design degree of freedom in the shape of the rotor iron core 12 can be improved.

Hereinafter, a sixth modified example will be described.

In the above-described embodiment and the above-described first to fifth modified examples, a bridge 16 disposed on the magnetic pole centerline L0 is included in at least any one of the plurality of air gap layers 11. However, the invention is not limited to this. Bridges 16 disposed on straight lines other than the magnetic pole centerline L0 may be included in all of the plurality of air gap layers 11.

According to the sixth modified example, by having the bridges 16 disposed on straight lines other than the magnetic pole centerline L0 in all of the plurality of air gap layers 11, the magnetic resistance in the direction of the d-axis can further prevented from becoming small. Accordingly, the leakage flux in the direction of the d-axis can be further reduced, and a decline in torque and power factor can be further limited.

According to at least one embodiment described above, by having the bridges 16 disposed on mutually different straight lines in the air gaps 11 adjacent to each other via the band-shaped magnetic paths 14, the bridges 16 can be prevented from being continuously disposed on the same straight line. Accordingly, while guaranteeing mechanical strength, the magnetic resistance can be prevented from becoming small on the same straight line, the leakage flux can be reduced, and a decline in torque and power factor can be limited.

Moreover, the rotor iron core 12 may have the bridges 16 disposed on the different straight lines in the air gaps 11 adjacent to each other among the plurality of air gap layers 11 so as not to be disposed on the magnetic pole centerline L0 as each other. Accordingly, the magnetic resistance in the direction of the d-axis can be prevented from becoming small, the leakage flux can be reduced, and a decline in torque and power factor can be limited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synchronous reluctance rotating electric machine comprising:
   a stator;
   a rotor iron core provided with a plurality of air gap layers and a plurality of magnetic path layers, each air gap layer being formed between adjacent two of the magnetic path layers; and
   at least one bridge provided in each of at least two of the air gap layers, each bridge bridging across the air gap layer in which it is provided, and a whole length of each bridge being entirely aligned with a line extending in a radial direction from a center of the rotor iron core,
   wherein the line with which at least one bridge provided in a first one of the air gap layers is aligned is different from the line with which at least one bridge formed in a second one of the air gap layers adjacent to the first one of the air gap layers is aligned.

2. The synchronous reluctance rotating electric machine according to claim 1, wherein one bridge provided in the first one of the air gap layers or the second one of the air gap layers is aligned with a line extending in the radial direction from the center of the rotor iron core toward a magnetic pole.

3. The synchronous reluctance rotating electric machine according to claim 1, wherein one of the plurality of air gaps has a single bridge and the single bridge is aligned with a line extending in the radial direction from the center of the rotor iron core toward a magnetic pole.

4. The synchronous reluctance rotating electric machine according to claim 1, wherein when any one of the plurality of air gap layers has two bridges, the two bridges are placed at axisymmetric positions with respect to a line from the center of the rotor iron core to a magnetic pole.

5. The synchronous reluctance rotating electric machine according to claim 1, wherein a width in a circumferential direction of a bridge formed in an air gap layer having a single bridge is wider than a width in the circumferential direction of bridges formed in an air gap layer having more than one bridge.

* * * * *